United States Patent [19]

Kunde

[11] Patent Number: 4,752,337

[45] Date of Patent: Jun. 21, 1988

[54] RECORDING LIQUID FOR INK JET RECORDING SYSTEMS

[75] Inventor: Klaus Kunde, Leverkusen, Fed. Rep. of Germany

[73] Assignee: Bayer Aktiengesellschaft, Leverkusen, Fed. Rep. of Germany

[21] Appl. No.: 58,500

[22] Filed: Jun. 5, 1987

[30] Foreign Application Priority Data

Jun. 11, 1986 [DE] Fed. Rep. of Germany ....... 3619572

[51] Int. Cl.$^4$ .............................................. C09D 11/02
[52] U.S. Cl. ...................................... 106/22; 106/20; 534/824; 534/829
[58] Field of Search .................... 106/20, 22; 534/824, 534/829

[56] References Cited

FOREIGN PATENT DOCUMENTS 2178439 2/1987 United Kingdom .

Primary Examiner—Amelia B. Yarbrough
Attorney, Agent, or Firm—Sprung Horn Kramer & Woods

[57] ABSTRACT

Recording liquid for ink jet recording systems containing dyestuffs of the formulae

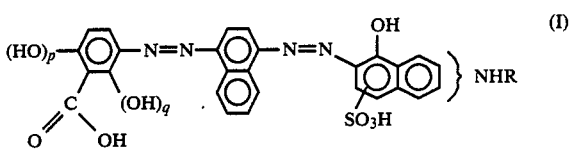

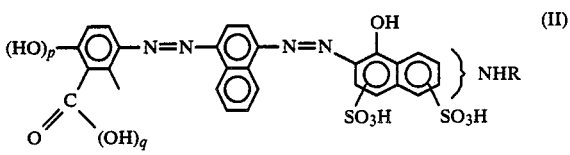

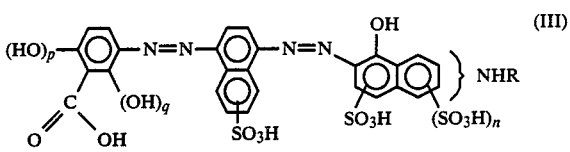

with the substituent definitions given in the description. They form high-contrast images of high fastness to water, light and abrasion.

6 Claims, No Drawings

RECORDING LIQUID FOR INK JET RECORDING SYSTEMS

The present invention relates to a recording liquid for ink jet recording systems, which is characterized in that it contains a dyestuff of the formula (I) in the form of its Li, K or alkanolammonium salt

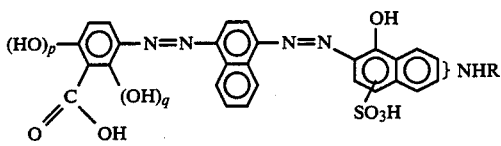

or a dyestuff of the formula (II) in the form of its alkali metal or alkanolammonium salt

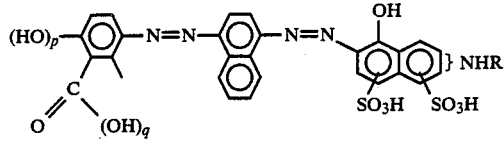

or a dyestuff of the formula (III) in the form of its alkali metal or alkanolammonium salt

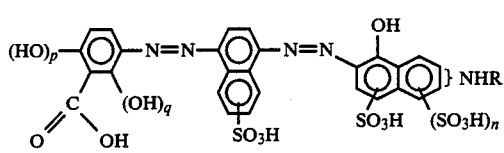

wherein
R=H, $C_1$–$C_4$-alkyl which is optionally substituted by hydroxyl or amino, optionally substituted $C_1$–$C_4$-alkylcarbonyl, optionally substituted phenyl or optionally substituted phenylcarbonyl,
n=0 or 1 and
p and q=0 or 1, and
wherein $$p+q=1,$$

and to their use in ink jet recording systems.
Preferred dyestuffs (I) are those of the formula (IV)

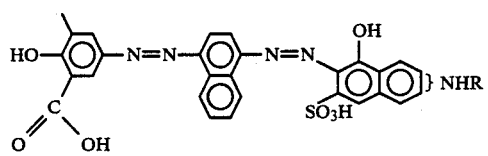

preferred dyestuffs II are those of the formulae (V), (VI) and (VII)

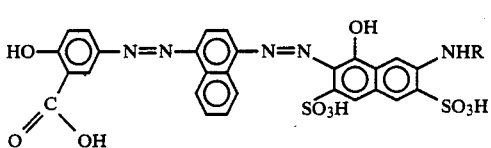

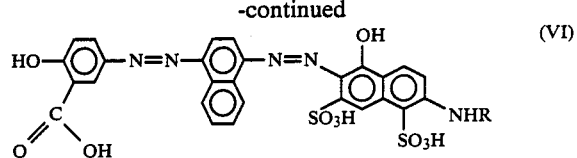

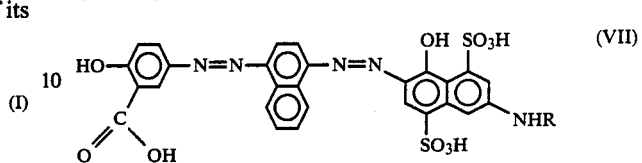

and preferred dyestuffs III are those of the formula (VIII)

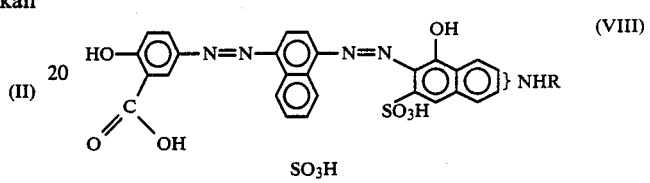

Preferred dyestuffs (I) to (VIII) are those where R=H, $CH_3$, $C_2H_4OH$, $C_2H_4NH_2$, phenyl, 3-sulphophenyl, acetyl, propionyl, benzoyl, maleinyl, 4-sulphophenyl, 3-carboxyphenyl or 4-carboxyphenyl.

The recording liquid can contain one or more dyestuffs (I).

Preferred alkali metal salts are the Li, Na and K salts.
Preferred alkanolammonium salts here are those with the cation

wherein
$R^1$=H or $C_1$–$C_4$-alkyl which is optionally substituted by OH or hydroxy-$C_1$–$C_4$-alkoxy, in particular $CH_3$, $C_2H_5$, $CH_2CH_2OH$, $CH_2CHOHCH_3$ or $C_3H_6OC_2H_4OH$ and
$R^2$=$C_1$–$C_4$-hydroxyalkyl or $C_1$–$C_4$-hydroxyalkoxy-$C_1$–$C_4$-alkyl, in particular $CH_2CH_2OH$, $CH_2CHOHCH_3$ or $C_3H_6OC_2H_4OH$.

The dyestuffs (I)–(VIII) are prepared in a manner which is known per se by diazotization of aminoazo compounds of the formula

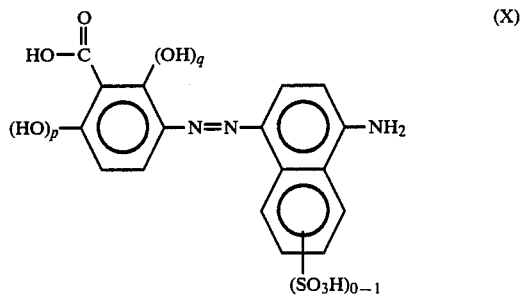

and coupling of the diazotization product with compounds of the formula

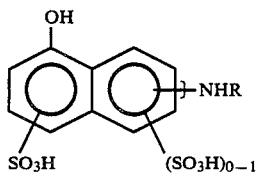

(XI)

in a neutral to alkaline medium.

(X) is obtained by coupling diazotized 3- and/or 5-aminosalicylic acid with the corresponding 1-aminonaphthalene-(sulphonic acids).

The recording liquids according to the invention in general contain about 1–20% by weight of one or more dyestuffs (I)–(VIII), 80–90% by weight of water and/or polar protic or dipolar aprotic solvents and, if appropriate, other customary constituents.

Preferred solvents here are polyhydric alcohols and ethers or esters thereof, carboxylic acid amides, sulphoxides and sulphones, in particular those with molecular weights of <200. Examples of particularly suitable solvents are: ethylene glycol, diethylene glycol, triethylene glycol, 2-hydroxyethyl acetate, 2-(2'-hydroxy)-ethyl acetate, glycerol, 1,2-dihydroxypropane, 1-methoxy-2-propanol, 2-methoxy-1-propanol, N,N-dimethylformamide, ε-caprolactam, N-methyl-ε-caprolactam, tetramethylurea, 1,3-dimethyl-2-imidazolidinone, N,N'-dimethylpropyleneurea, dimethylsulphoxide, dimethylsulphone and sulpholane.

The inks according to the invention are prepared, for example, by dissolving the corresponding salts of the dyestuffs (I) in water and/or one or more of the abovementioned organic solvents, if appropriate at elevated temperatures and with the addition of inorganic or organic bases; if appropriate, customary ionic or non-ionic additives can also additionally be used, for example those with which the viscosity can be reduced and/or the surface tension can be increased.

Instead of the salts of (I), it is also possible for the corresponding free acids to be used in combination with at least equimolar amounts of the corresponding bases.

Inorganic bases which can be used are, for example, lithium hydroxide, sodium hydroxide, potassium hydroxide, lithium carbonate, sodium carbonate and potassium carbonate.

Organic bases which can be used are, for example, ethanolamine, diethanolamine, triethanolamine, N-methylethanolamine, N,N-dimethylethanolamine, N-methyldiethanolamine, 1-amino-2-propanol, 2-amino-1-propanol, di-isopropanolamine, N-2-hydroxyethyldiisopropanolamine, tris-N,N,N-[2-(2'-hydroxyethoxy)-ethyl]-amine or sodium methylate, lithium ethylate or potassium tert.-butylate.

High-contrast, sharp images of high fastness to water, light and abrasion are obtained when the dyestuffs according to the invention are used in ink-jet inks.

The inks according to the invention are stable to storage, heat and during use and their viscosity and surface tension can be adapted to suit various requirements; they have a good recording capacity and good jet stabilities.

EXAMPLE 1

3 g of the dyestuff of the formula (a)

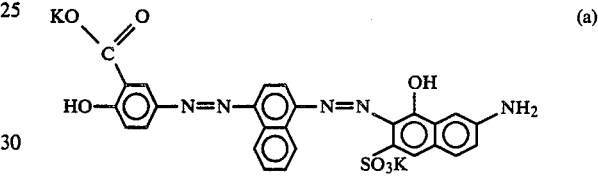

are dissolved in 67 g of water and 30 g of diethylene glycol at room temperature; the solution is filtered through a 1μ filter and then degassed in vacuo. A black ink which gives recordings which are fast to light, rubbing and water in the ink jet process is obtained.

EXAMPLE 2–8

If a dyestuff of the formula (b) to (h) is used instead of the dyestuff employed in Example 1, black inks which give recordings which are fast to light, rubbing and water in the ink jet process are likewise obtained.

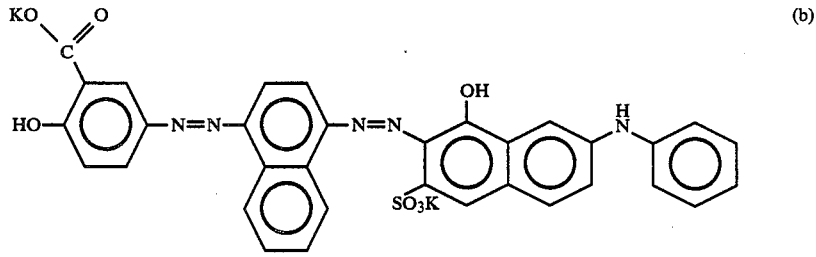

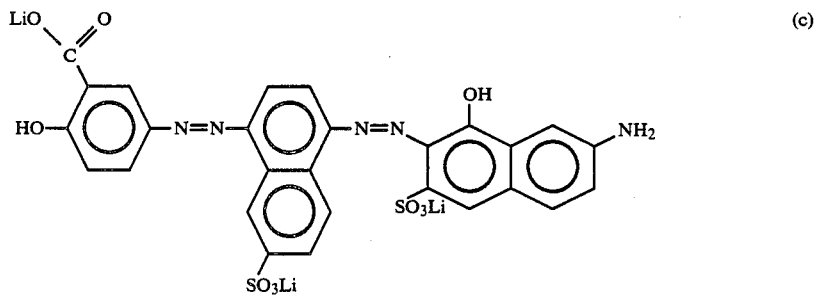

-continued

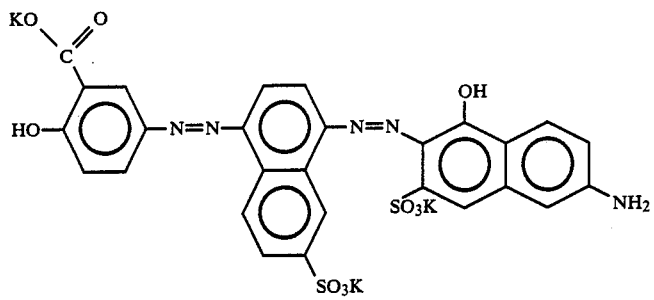
(d)

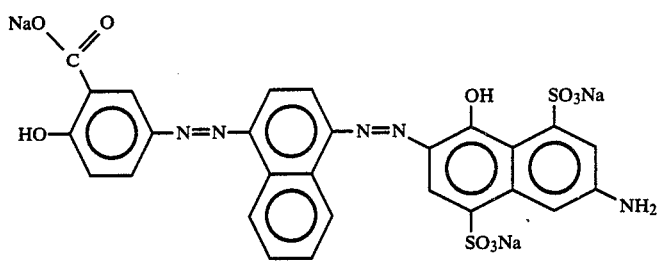
(e)

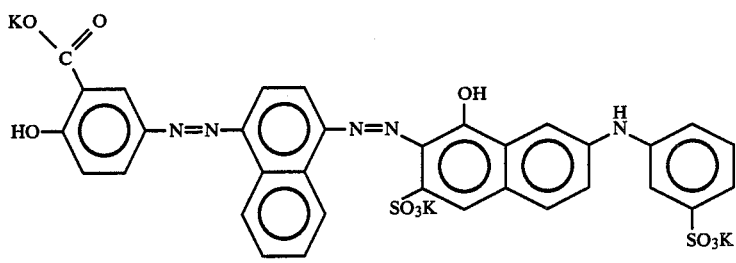
(f)

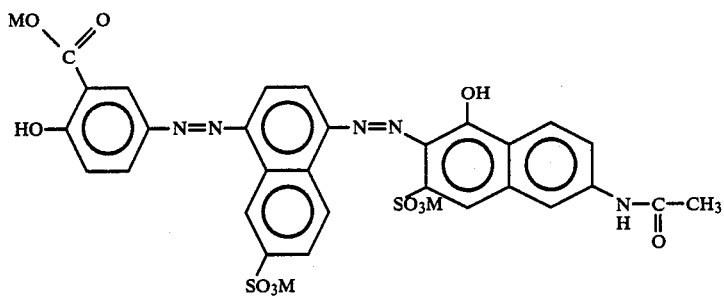
(g)

M = HN(C₂H₄OH)₃⊕

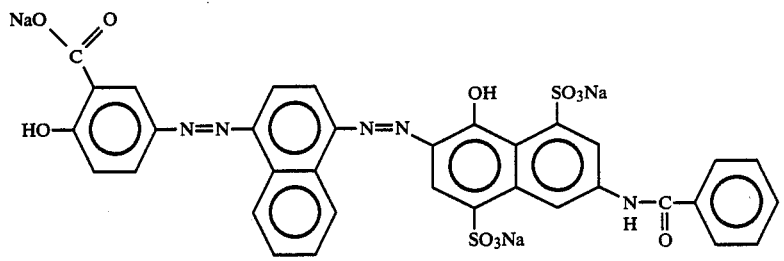
(h)

EXAMPLE 9

3 g of the dyestuff of the formula (i) are dissolved in 30 g of dimethylsulphoxide and 66 g of ethylene glycol at room temperature, with the addition of 1 g of potassium hydroxide; the solution is filtered through a 1μ filter and then degassed in vacuo. A black ink which gives recordings which are fast to light, rubbing and water in the ink jet process is obtained.

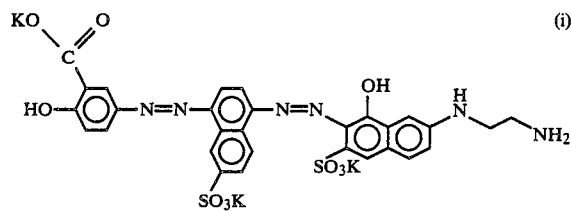
(i)
EXAMPLE 10-14
If a dyestuff of the formula (k) to (o) is used instead of that employed in Example 9 and the corresponding base is used, black inks which give recordings which are fast to light, rubbing and water in the ink jet process are likewise obtained.
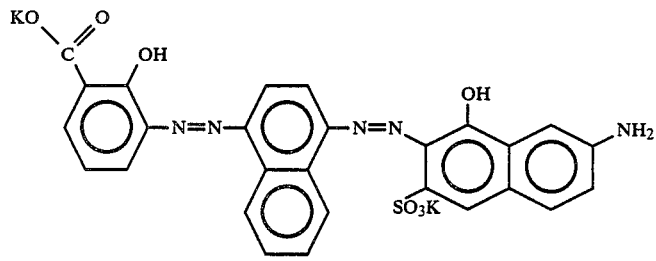
(k)
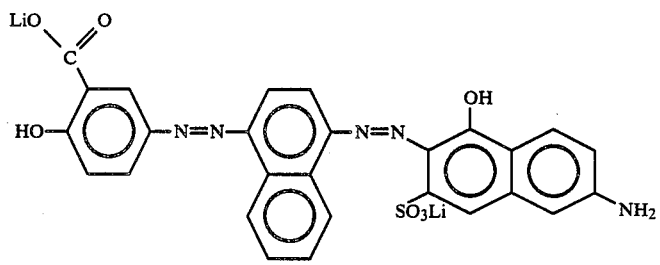
(l)
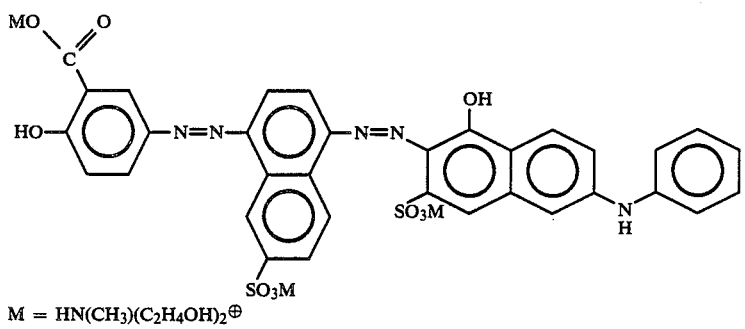
(m)
$M = HN(CH_3)(C_2H_4OH)_2^{\oplus}$
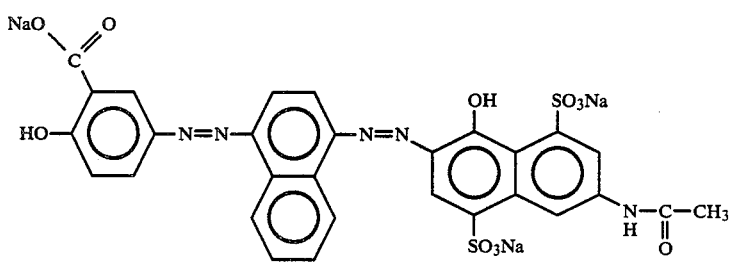
(n)
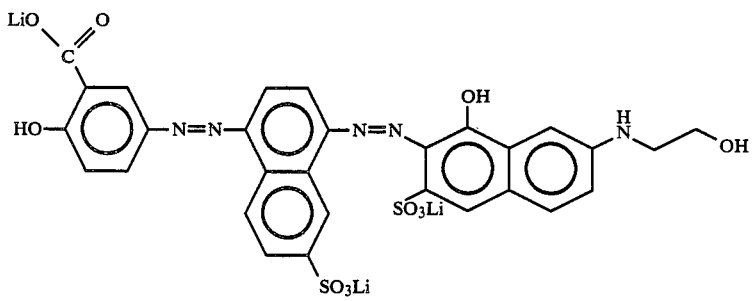
(o)

EXAMPLE 15

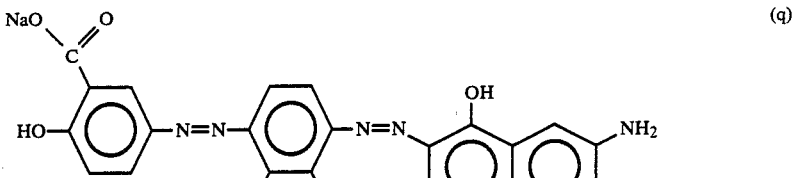

(q)

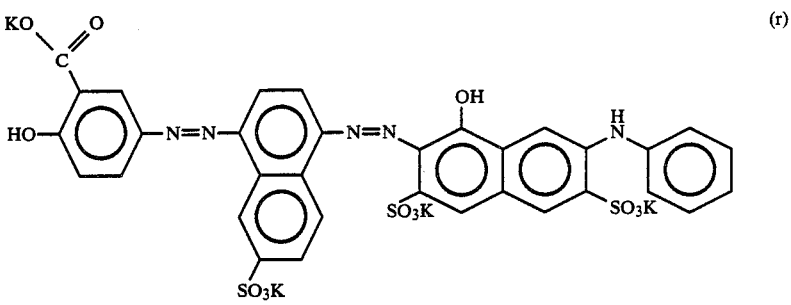

(r)

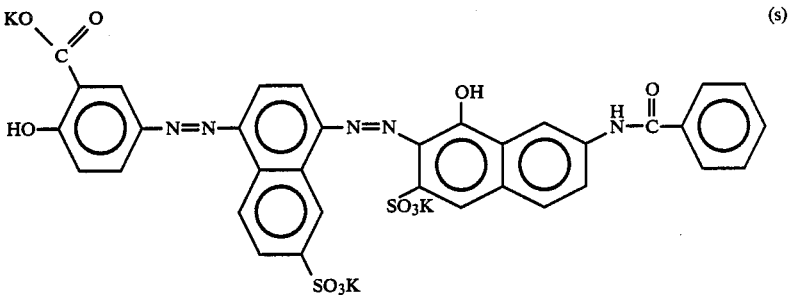

(s)

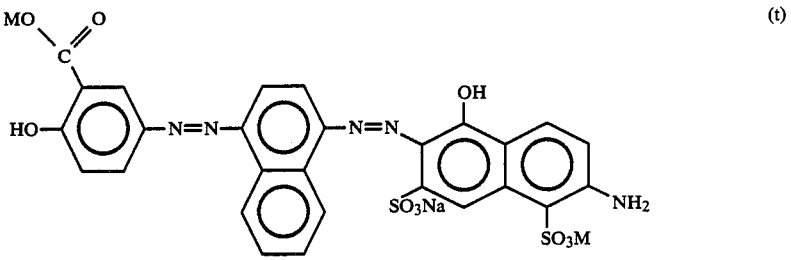

(t)

$M = H_2N(C_2H_4OH)_2^{\oplus}$ 3 g of the dyestuff of the formula (p) are dissolved in 20 g of ε-caprolactam, 60 g of water and 17 g of glycerol at room temperature; the solution is filtered through a 1μ filter and then degassed in vacuo. A black ink which gives recordings which are fast to light, rubbing and water in the ink jet process is obtained.

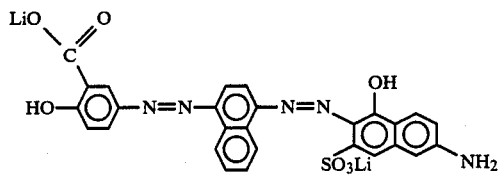

(p)

EXAMPLES 16–19

If a dyestuff of the formula (q) to (s) is used instead of that employed in Example 15, black inks which give recordings which are fast to light, rubbing and water in the ink jet process are likewise obtained.

What is claimed is:

1. Recording liquid for ink jet recording systems, comprising a dyestuff of the formula

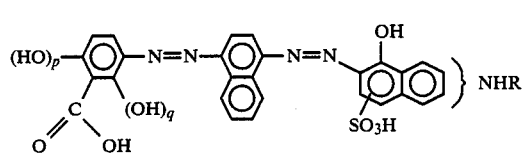

in the form of an Li, K or alkanolammonium salt, or a dyestuff of the formula

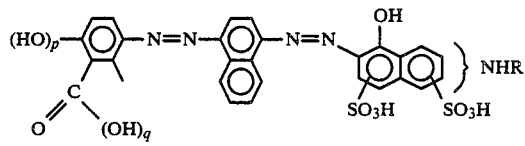

or

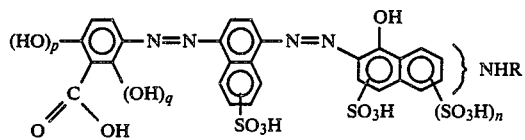

in the form of an alkali metal salt or alkanolammonium salt, wherein

R=H, $C_1$–$C_4$-alkyl which is optionally substituted by OH or amino, optionally substituted $C_1$–$C_4$-alkylcarbonyl, optionally substituted phenyl or optionally substituted phenylcarbonyl, n=0 or 1 and p and q=0 or 1, and wherein $p+q=1$.

2. Recording liquid according to claim 1, comprising dyestuffs of the formula

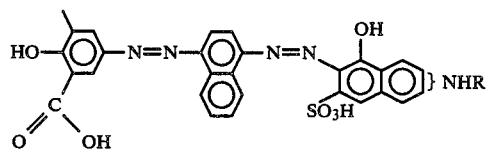

in the form of their Li, K or alkanolammonium salt.

3. Recording liquid according to claim 2, comprising dyestuffs of the formula

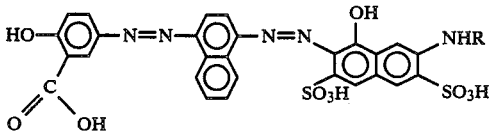

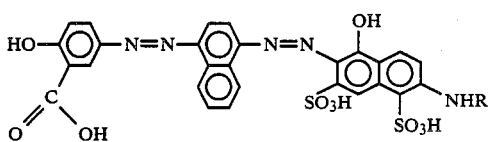

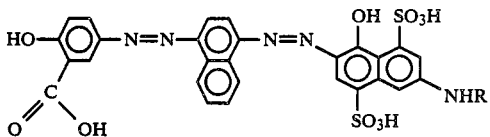

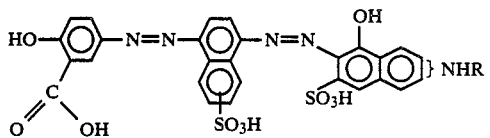

in the form of their alkali metal or alkanolammonium salts.

4. Recording liquid according to claim 1, comprising dyestuffs where

R=H, $CH_3$, $C_2H_4OH$, $C_2H_4NH_2$, phenyl 3-sulphophenyl, acetyl, propionyl, benzoyl, maleinyl, 4-sulphophenyl, 3-carboxyphenyl or 4-carboxyphenyl.

5. Recording liquid according to claim 1, comprising dyestuffs with the cation

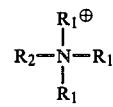

wherein $R^1$=H or $C_1$–$C_4$-alkyl which is optionally substituted by OH or hydroxy-$C_1$–$C_4$-alkoxy, in particular $CH_3$, $C_2H_5$, $CH_2CH_2OH$, $CH_2CHOHCH_3$ or $C_3H_6OC_2H_4OH$ and $R^2$=$C_1$–$C_4$-hydroxyalkyl or $C_1$–$C_4$-hydroxyalkoxy-$C_1$–$C_4$-alkyl, in particular $CH_2CH_2OH$, $CH_2CHOHCH_3$ or $C_3H_6OC_2H_4OH$.

6. An ink jet recording system containing a recording liquid according to claim 1.

* * * * *